United States Patent
Keohane et al.

(10) Patent No.: US 9,697,378 B2
(45) Date of Patent: Jul. 4, 2017

(54) NETWORK ENCRYPTED DATA OBJECT STORED ON AN ENCRYPTED FILE SYSTEM

(71) Applicant: International Business Machines Corporation, Armonk, NY (US)

(72) Inventors: Susann M. Keohane, Austin, TX (US); Shawn P. Mullen, Buda, TX (US); Jessica C. Murillo, Round Rock, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 14/106,225

(22) Filed: Dec. 13, 2013

(65) Prior Publication Data

US 2015/0169894 A1    Jun. 18, 2015

(51) Int. Cl.
- *H04L 29/06* (2006.01)
- *H04L 9/00* (2006.01)
- *G06F 21/00* (2013.01)
- *G06F 21/62* (2013.01)
- *H04L 9/08* (2006.01)
- *H04L 29/08* (2006.01)

(52) U.S. Cl.
CPC ........ *G06F 21/6227* (2013.01); *H04L 9/0894* (2013.01); *H04L 67/10* (2013.01); *G06F 2221/2107* (2013.01); *H04L 2463/062* (2013.01)

(58) Field of Classification Search
CPC ................. G06F 21/6227; H04L 2463/062
USPC .................... 713/165, 189, 193; 380/277
See application file for complete search history.

(56) References Cited

U.S. PATENT DOCUMENTS

| | | | |
|---|---|---|---|
| 6,851,063 B1* | 2/2005 | Boyle | H04K 1/02 380/232 |
| 7,058,696 B1* | 6/2006 | Phillips | G06F 17/30861 707/999.01 |
| 2002/0019938 A1* | 2/2002 | Aarons | G06Q 20/00 713/168 |

(Continued)

FOREIGN PATENT DOCUMENTS

EP    2403244 A1    1/2012

OTHER PUBLICATIONS

Intel, "Intel Advanced Encryption Standard New Instructions (AES-NI) Ecosystem Update," pp. 1-5, Mar. 2013 Update, © Intel Corporation. http://www.intel.com/content/www/us/en/architecture-and-technology/advanced-encryption-standard--aes-/aes-ni-ecosystem-update.html.

(Continued)

*Primary Examiner* — Alexander Lagor
(74) *Attorney, Agent, or Firm* — Heather S. Chatterton

(57) ABSTRACT

A method of storing a data object received from a network is described. An encrypted data object encrypted with a first encryption key is received. It is determined whether the encrypted data object is to be stored in an encrypted file system that requires encryption of a data object with a second encryption key. The first encryption key is encrypted with a third encryption key when it is determined the encrypted data object is to be stored in the encrypted file system. The first encryption key is attached to the encrypted data object. The data object encrypted by the first encryption key is stored in the encrypted file system.

20 Claims, 6 Drawing Sheets

(56) References Cited

U.S. PATENT DOCUMENTS

| | | | |
|---|---|---|---|
| 2002/0138722 A1* | 9/2002 | Douceur | H04L 9/0894 713/153 |
| 2005/0097061 A1* | 5/2005 | Shapiro | G06F 21/6209 705/67 |
| 2006/0179309 A1* | 8/2006 | Cross | G06F 21/602 713/168 |
| 2006/0179327 A1* | 8/2006 | Musa | G06F 21/6227 713/193 |
| 2008/0001752 A1* | 1/2008 | Bruns | G06Q 10/08 340/572.1 |
| 2009/0106552 A1* | 4/2009 | Mohamed | G06F 21/6227 713/165 |
| 2009/0323940 A1* | 12/2009 | Moffat | H04L 9/0894 380/44 |
| 2011/0119487 A1 | 5/2011 | Alexander et al. | |
| 2011/0126008 A1* | 5/2011 | Song | G06F 21/6218 713/167 |
| 2011/0252234 A1* | 10/2011 | De Atley | H04L 9/0891 713/165 |
| 2012/0284506 A1 | 11/2012 | Kravitz et al. | |
| 2013/0034229 A1* | 2/2013 | Sauerwald | H04L 9/0822 380/46 |
| 2013/0191629 A1* | 7/2013 | Treinen | H04L 9/08 713/153 |
| 2014/0281545 A1* | 9/2014 | Erofeev | G06F 21/6218 713/171 |
| 2014/0359309 A1* | 12/2014 | Cachin | H04L 9/0822 713/189 |
| 2015/0127952 A1* | 5/2015 | Bowman | G06F 21/602 713/189 |
| 2015/0341359 A1* | 11/2015 | Yang | H04L 63/10 726/1 |

OTHER PUBLICATIONS

Mell et al., "The NIST Definition of Cloud Computing", National Institute of Standards and Technology, NIST Special Publication 800-145, Sep. 2011, Gaitersburg, MD.

* cited by examiner

NETWORK ENCRYPTED DATA OBJECT STORED ON AN ENCRYPTED FILE SYSTEM

BACKGROUND

The present invention relates generally to protecting code and data on a computer system and network, and more particularly to storing a network encrypted data object on an encrypted file system.

The Internet is one of the most powerful tools used today. It may be one of the most significant tools driving business, economic, and social change. However, like many tools the Internet is subject to errors and misuse. Protecting data and software on a computer system and over networks from other software, including software that an attacker may be able to introduce into a targeted computer system is of concern.

SUMMARY

In various embodiments, a method of storing a data object received from a network is described. An encrypted data object encrypted with a first encryption key is received. It is determined whether the encrypted data object is to be stored in an encrypted file system that requires encryption of a data object with a second encryption key. The first encryption key is encrypted with a third encryption key when it is determined the encrypted data object is to be stored in the encrypted file system. The first encryption key is attached to the encrypted data object. The data object encrypted by the first encryption key is stored in the encrypted file system.

In various embodiments, a computer system is described. The computer system includes a processor, an encrypted file system communicatively coupled to the processor; and memory communicatively coupled to the processor and encrypted file system. The memory is encoded with instructions. The instructions when executed by the processor include the method of storing a data object received from a network. An encrypted data object encrypted with a first encryption key is received. It is determined whether the encrypted data object is to be stored in an encrypted file system that requires encryption of a data object with a second encryption key. The first encryption key is encrypted with a third encryption key when it is determined the encrypted data object is to be stored in the encrypted file system. The first encryption key is attached to the encrypted data object. The data object encrypted by the first encryption key is stored in the encrypted file system.

In yet other various embodiments, a computer program product executing the method of storing a data object received from a network. An encrypted data object encrypted with a first encryption key is received. It is determined whether the encrypted data object is to be stored in an encrypted file system that requires encryption of a data object with a second encryption key. The first encryption key is encrypted with a third encryption key when it is determined the encrypted data object is to be stored in the encrypted file system. The first encryption key is attached to the encrypted data object. The data object encrypted by the first encryption key is stored in the encrypted file system.

BRIEF DESCRIPTION OF THE DRAWINGS

Embodiments will be better understood from the following detailed description with reference to the drawings, in which.

DETAILED DESCRIPTION

Figure 1:
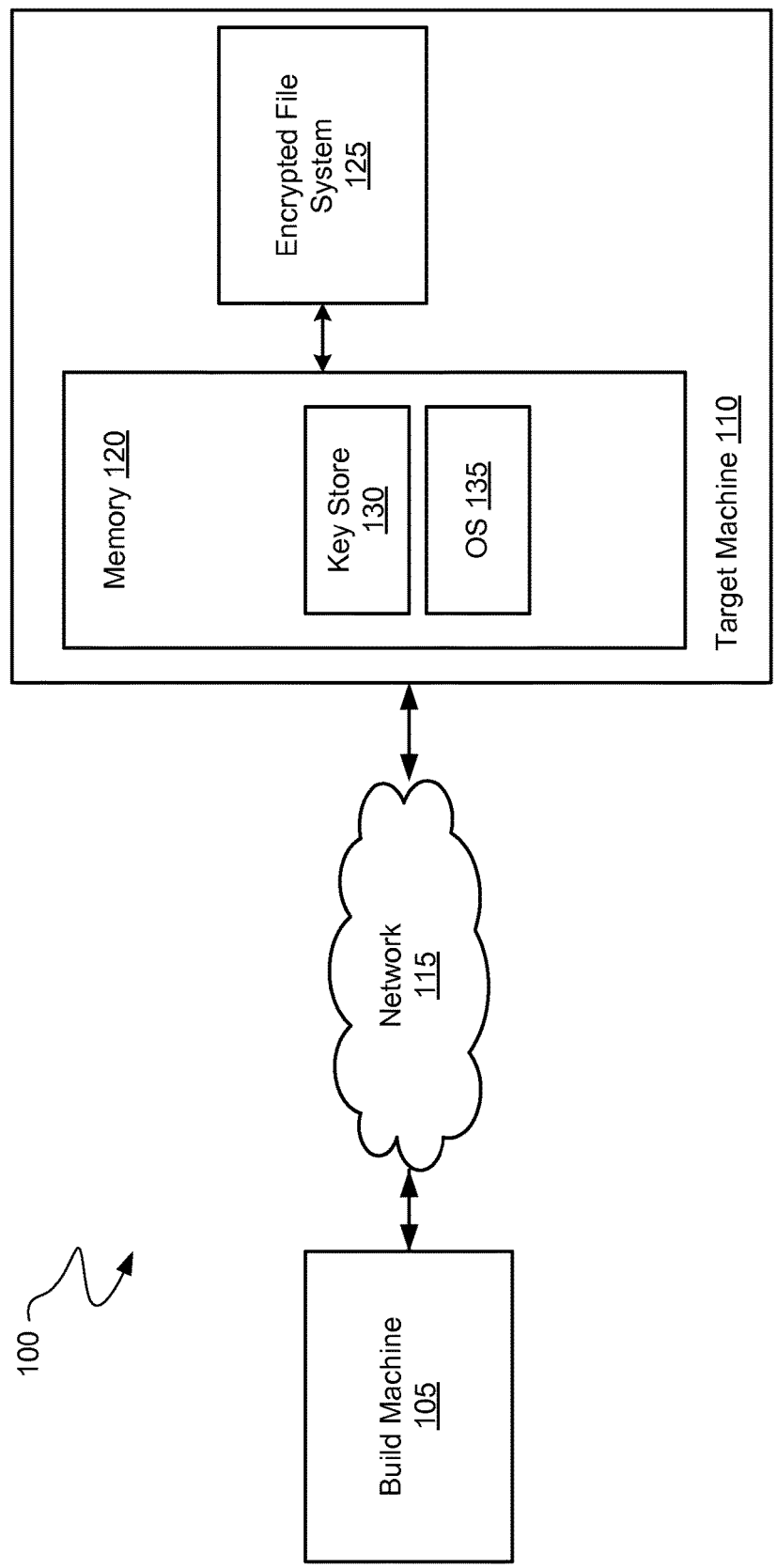
FIG. 1 depicts a block diagram of a network system with network and file encryption for data objects, according to various embodiment.

Features illustrated in the drawings are not necessarily drawn to scale. Descriptions of well-known components and processing techniques are omitted so as to not unnecessarily obscure the disclosed embodiments. The descriptions of embodiments are provided by way of example only, and are not intended to limit the scope of the embodiments as claimed. The same numbers may be used in the Figures and the Detailed Description to refer to the same devices, parts, components, steps, operations, and the like.

Security of data over networks and cloud solutions is a growing concern. A way to protect data is with cryptography. Cryptography uses encryption keys and encryption algorithms to encrypt and decrypt data while sending it between two or more systems. Data protection over a network and cloud solutions may take two basic forms, protection in-flight and protection at-rest. More specifically, the two forms are protecting data over the network and protection the data while in storage.

As one example of in-flight protection, a computer system that builds a data object (build machine) encrypts the data object for transfer over the network to a target computer system (target machine). The network transfer may be done by a secure network protocol such as Secure File Transfer Protocol (sftp). Once received at the target machine, the operating system may decrypt the encrypted network data object while it is in-the-clear in memory on the target machine. As one example of at-rest data protection, the target machine may store the data object in a secure file system, such as Encrypted File System (EFS). As the data object enters the secure file system, the data object may be encrypted again with a unique file key that is generated for the data object. The file key may be encrypted or "wrapped" by a public key from a keystore of a user of the target machine. The wrapped file key may be stored with the encrypted file data object in unique metadata of the file data object.

A recognized cost of cryptography may be a compute performance penalty. Many system resources may be required to encrypt and decrypt data. In the above examples, the decryption of the network data object and re-encryption of the data object as the data object enters the encrypted file system require target machine resources for both steps. Some of the use of these resources may be costly to system performance especially when large amounts of encrypted data are transferred over a network. The impact on system performance may be particularly large in battery powered devices, such as tablets and smart phones.

Various embodiments herein provide for ways to store an encrypted data object directly into the secure files system of a target machine. Various embodiments reuse the session key used by the build machine to encrypt the data object. This eliminates the need to decrypt the encrypted network data object as it is received by the target machine. It also eliminates the step to then encrypt the unencrypted network data object when it is to enter the secure files system.

The use of target machine resources may be reduced by eliminating the decryption and encryption when the encrypted network data object is received by the target machine and when the data object enters the encrypted file system respectively. The operating system of the target machine may recognize that the data object coming over the network is encrypted and also the operating system may know whether encrypted data object is to be stored in the encrypted file system. Instead of decrypting then re-encrypting the encrypted network data object when it reaches the target machine, the operating system of the target machine may store the encrypted network data object directly into the encrypted file system of the target machine. The operating system may then also take session key that can decrypt the encrypted network data object and store the session key directly into the metadata of the encrypted network data object as it is placed in the encrypted file system. The session key may be wrapped by a user's public key that is stored in a hardware keystore.

FIG. 1 depicts a block diagram of a network system 100 with network and file encryption for data objects, according to various embodiment. The network system 100 may include a first computer system that builds a data object (build machine) 105, a second computer system that receives data objects from the build machine (target machine) 110, and a network 115 that the data objects may be transferred over between the build machine 105 and the target machine 110.

In various embodiments, the build machine 105 may create a data object that is to be sent to the target machine 110 over the network 115. Before the data object is sent to the target machine 110 the data object may be encrypted by various encryption schemes that may protect the data object as it is being transferred from the build machine 105 to the target machine 110.

For example, in various embodiments the data object may be encrypted with a symmetric session key and sent to the target machine 110 as an encrypted network data object. These various key schemes may be further explained herein such as when discussing FIG. 3. The target machine 110 may already have the symmetric session key to decrypt the encrypted network data object. In various embodiments, the symmetric session key may be encrypted with a public key of a second public/private key pair and sent with the encrypted network data object. The encrypted session key may be decrypted by a private key of the target machine. In various embodiments, the encrypted data object may be signed with a digital signature by a private key of a first public/private key pair and a signing algorithm. A public key of the build machine of the first public/private key pair may be sent with the encrypted data object. The build machine public key may be compared with a target machine public key of the first public/private key pair for authentication purposes and the target machine public key may then be used to verify the digital signature when the encrypted network data object arrives at the target machine 110.

The target machine may contain memory 120 that is "in the clear" and an encrypted file system 125 which may be another storage device separate from the memory 120 or part of the memory 120 that may be secure and contains encrypted data files. Data objects in the memory 120 may be directed to be stored as encrypted data files in the encrypted file system 125. The memory 120 may contain a keystore 130, and an operating system (OS) 135 that may be configured to encrypt the data objects being sent from the memory 120 to the encrypted file system 125. The encryption and decryption may be done with various encryption keys and encryption/decryption algorithms such as Advanced Encryption Standard (AES).

The keystore 130 may be a storage system for public and private data that is used for file encryption/decryption, for controlling access to encrypted data files, and for user and group management of the target machine 110. Each user of the system may have a keystore 130. A keystore 130 may be automatically created when a user is assigned a password. A public/private key pair may be automatically generated and stored in the keystore 130 such as the third public/private key pair described in FIG. 3. The keystore 130 for the user may contain, apart from the user's public/private key, other access keys. The keystore 130 for the user may be protected by an access key. The access key may be used to encrypt the private parts of the keystore 130.

The operating system 135 may be any operating system that may support an encrypted file system (EFS) 125. An example of an operating system using an encrypted file system is AIX; however other operating systems are contemplated. The operating system 135 may be configured to encrypt and decrypt data objects in memory 120 and store the encrypted data objects as encrypted data files in the encrypted file system 125. Encryption/decryption algorithms such as AES may be used by the operating system 135 to perform some of its operations. If a data object is not encrypted in the memory 120 and is to be stored in the encrypted file system 125, then the operating system 135 may generate a unique file key for the data object. The file key may be a symmetric key. The data object may be encrypted with the file key through an encryption algorithm. The data object may then be an encrypted data file.

The encrypted data file may be stored in the encrypted file system 125. The file key may then be encrypted. The file key may be encrypted with public keys of the user, the group, or both that is authorized to view the encrypted data file. The public keys may be obtained from the keystore 130. The encrypted file key may be stored in the encrypted data file's extended attribute also referred to as metadata herein. There may be an extended attribute for each user and group that has access to the encrypted data file.

Figure 3:
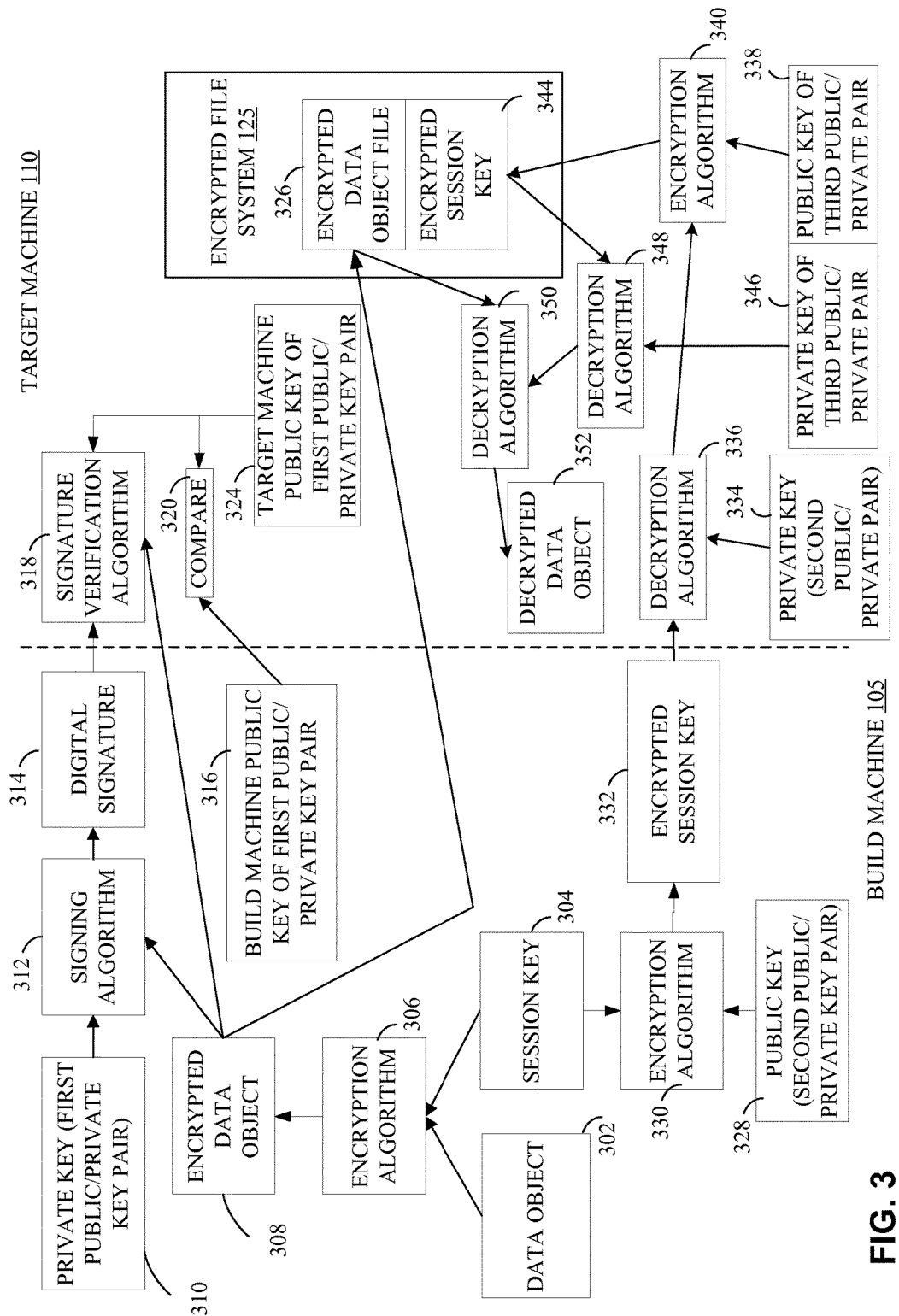
FIG. 3 depicts an overview of operations that may be performed in various embodiments.

In other embodiments, the operating system 135 may be configured to detect when an encrypted network data object arrives at the build machine 110 that is to be stored in the encrypted file system 125. The operating system 135 may bypass: decrypting the encrypted network data object, processing the data object, and encrypting it with the file key before storing the encrypted network data object in the encrypted file system 125. Instead, the operating system 135 may place the encrypted network data object into the encrypted file system 125. The operating system 135 may place the session key for the encrypted network data object in the metadata of the encrypted network data object. In various embodiments, the session key may be encrypted when received by the target machine 110. In various embodiments, the session key may be decrypted by the target machine's private key of the second public/private key pair as illustrated in FIG. 3. The operating system 135 may then encrypt the session key with a public key of the third public/private key pair of one or more users and one or more groups or both from the keystore 130. The encrypted session key may be stored as one or more extended attributes of the encrypted data file. Storing the encrypted network data object directly into the encrypted file system 125 may reduce the use of the resources of the target machine 110 by eliminating other encryption and decryption steps.

Figure 2:
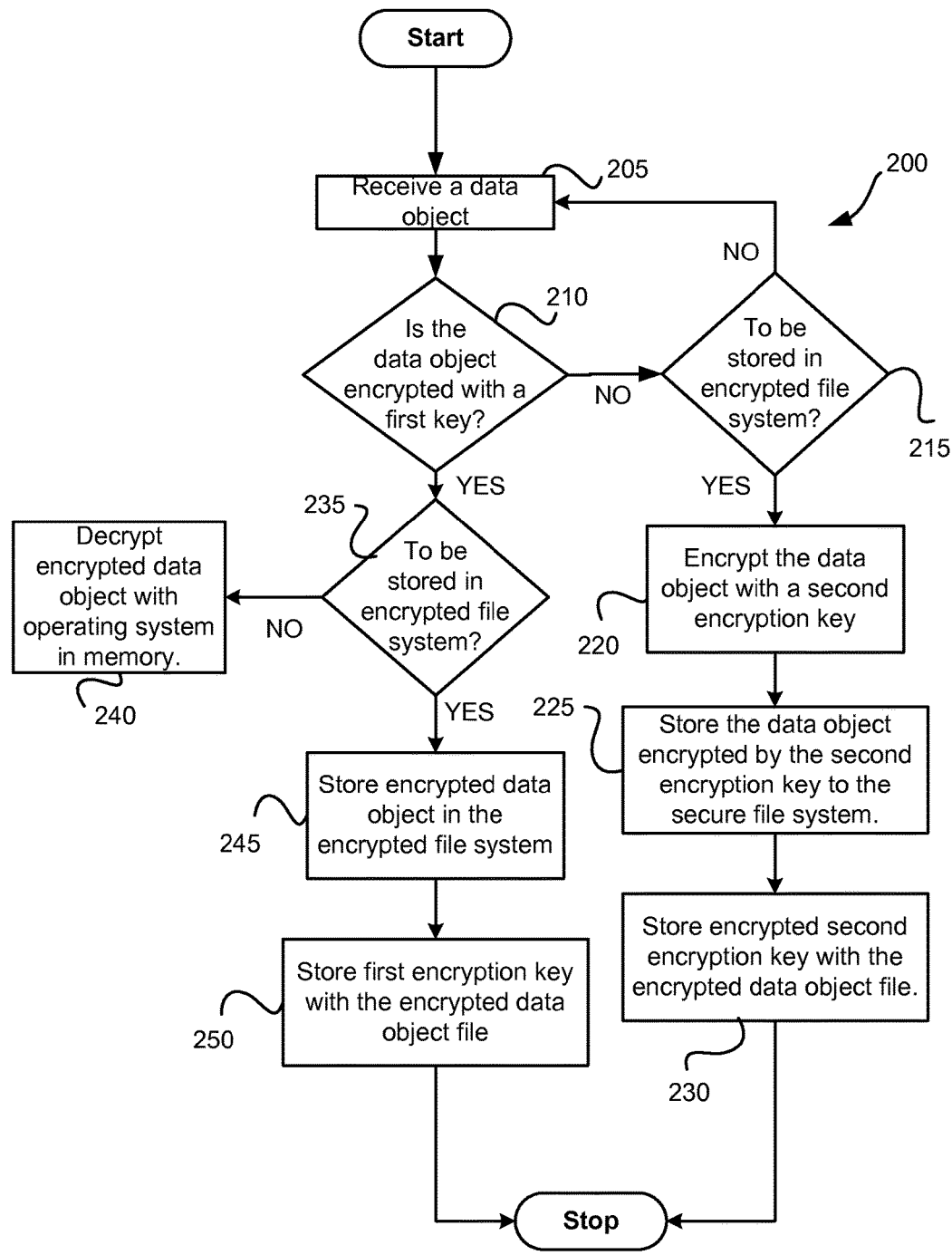
FIG. 2 depicts method of using a network encryption of a data object in place of a file encryption of the data object when stored in an encrypted file system, according to various embodiments.

FIG. 2 depicts method 200 of using a network encryption of a data object in place of a file encryption of the data object when stored in an encrypted file system, according to various embodiments. In operation 205, the target machine 110 (FIG. 1) may receive a data object for processing from a network. The data object may be an encrypted network data object or it may be another data object that is not encrypted.

In operation 210, the operating system 135 (FIG. 1) of the target machine 110 may determine whether the data object is an encrypted data object encrypted with a first encryption key. For instance, the first encryption key may be the session key that encrypts the data object as it is being transferred over a network 115 from a build machine 105 to a target machine 110. The first encryption key may be a symmetric key. If the data object is not encrypted with the first encryption key, then the method may continue to operation 215 where it may be determined whether the data object is to be stored in an encrypted file system such as encrypted file system 125 of FIG. 1.

If the data object is to be stored, processed, or some other function without going into the encrypted file system 125, then the method 200 may return to monitoring the memory 120 for a new data object received. If the data object is to be stored in the encrypted file system 125, then, in operation 220, the data object may be encrypted with a second encryption key such as the file key discussed in FIG. 1.

In operation 225, the encrypted data object encrypted by the second encryption key may be stored in the encryption file system 125 as an encrypted data file. In operation 230, the second encryption key may be stored with the encrypted data file within the encrypted file system 125. In various embodiments, the second encryption key may be stored in metadata of the encrypted data file. In various embodiments, the second encryption key may be encrypted also known as wrapped with a third encryption key such as public key of the third public/private key pair. The wrapping of the second encryption key may occur before it is stored in the encrypted file system 125 with the encrypted data file. The third public/private key pair may allow a user or group to access the data object in the encrypted data file. Each user and group may have a keystore 130 that contains these public/private key pairs in memory 120. Each user and group may have an extended attribute for the encrypted data file. After the data object is stored in the encrypted file system the method 200 may end or return to the start to receive a new data object.

Returning to operation 210, if the data object is encrypted with a first encryption key such as a session key, then the method 200 may continue to operation 235. In operation 235, the operating system 135 may determine whether the encrypted data object is to be stored in the encrypted file system 125. If the data object is not to be stored in the encrypted file system 125, then, in operation 240, the data object may be decrypted by the operating system 135 in the memory 120 or some other operation may occur with it. The operating system 135 along with a decryption algorithm may use a symmetric key of the first encryption key to decrypt the encrypted data object. The data object may be used or directed as necessary.

If in operation 235 the encrypted data object is to be stored in the encrypted file system 125, then the method 200 may continue at operation 245. In operation 245, the operating system may recognize that the data object is encrypted and may directly store the data object within the encrypted file system 125 as an encrypted data file. The operating system 135 may abstain or forgo encrypting the data object with the second encryption key, which may result in the savings of target machine resources.

In operation 250, the first encryption key that was used to encrypt the encrypted network data object may be stored as an extended attribute of the encrypted data file. The first encryption key may be later used to decrypt the encrypted data file. In various embodiments, the first encryption key may be encrypted (also known as wrapped) with the third encryption key such as public key of the third public/private key pair. The wrapping of the first encryption key may occur before it is stored in the encrypted file system 125 with the encrypted data file. The third public/private key pair may allow a user or group to access the data object in the encrypted data file. Each user and group may have a keystore 130 that contains these public/private key pairs in memory 120. Each user and group may have an extended attribute for the encrypted data file. After the data object is stored in the encrypted file system the method 200 may end or return to the start to receive a new data object. Storing the encrypted network data object directly into the encrypted file system 125 may reduce the use of the resources of the target machine 110 by eliminating other encryption and decryption steps.

FIG. 3 depicts an overview of operations that may be performed in various embodiments. At the build machine 105, a data object 302 may be created and sent to a target machine 110. The data object 302 may need to be sent over a network securely. To do this the data object 302 may be encrypted by a session key 304 with an encryption algorithm 306 to create an encrypted network data object 308. The session key 304 may be a symmetric key. In various embodiments, the encrypted network data object 308 may be sent to the target machine 110, recognized as an encrypted network data object, and stored directly into the encrypted file system 125 as an encrypted data file 326.

In other various embodiments, additional security may be in place when sending an encrypted network data object 308 to a target machine 110. These embodiments may be used when data objects are sent through an unsecure channel. For instance, a private key of a first public/private key pair 310 may be used with a signing algorithm 312 to digitally sign the encrypted network data object 308 creating a digital signature. A build machine public key 316 of the first public/private key pair may be sent with the encrypted data object 308 to the target machine 110. The build machine public key 316 may be compared in a compare operation 320 with a target machine public key 324 of the first public/private key pair to authenticate that the correct target machine public key 324 is being used to verify the digital signature. This comparison may be performed in memory 120 and may detect an attack in which the attacker uses an incorrect or out-dated build machine public key. Once the comparison is complete, the target machine public key 324 may be used with the encrypted network data object 308 and a signature verification algorithm 318 to verify the encrypted network data object 308. The operating system may then store the network encrypted data object into the encrypted file system 125 as an encrypted data file 326.

Since the session key 304 may be a symmetric key the target machine 110 may need the session key 304 to decrypt the encrypted network data object 308 when at the target machine 110. To securely send the session key 304 to the target machine 110 current network connection protocols such as ssh (Secure Shell) protocol protects the sharing of the session key 304 via existing public/private keys. The public/private keys are used only during the network stage. As shown in FIG. 3, a public key 328 of a second public private key pair may be used with an encryption algorithm 330 to encrypt the session key 304 creating the encrypted session key 332. The encrypted session key 332 may be sent to the target machine 110 where it may be decrypted by a private key 334 of the second public/private key pair with a decryption algorithm.

If the encrypted data file 326 is in the encrypted file system 125, then the session key 304 used to encrypt it may be stored and protected in the encrypted file system 125 as well. After being decrypted when received by the target machine 110 over the network, a user of the data object 302 at the target machine 110 may encrypt the session key with a public key 338 of a third public/private key pair that is in the user's keystore 130 (FIG. 1) and an encryption algorithm 340. The session key may be stored in the metadata also referred to as extended attributes of the encrypted data file 326 as encrypted session key 344.

When the data object is to be used, the target machine 110 may retrieve the encrypted data file 326 and the encrypted session key 344 from the encrypted file system 125. A private key 346 of the third public private key pair stored in the keystore 130 may be used along with a decryption algorithm 348 to decrypt the encrypted session key 344. Once decrypted, the session key along with another decryption algorithm 350 may be used to decrypt the encrypted data file 326. This may result in an unencrypted data object 352 that may be used in the clear. By directly storing an encrypted network data object in an encrypted file system, machine resources may be conserved by reducing the amount of resource intensive decryptions and encryptions of data objects between the arrival from the network 105 and storage in the encrypted file system 125.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
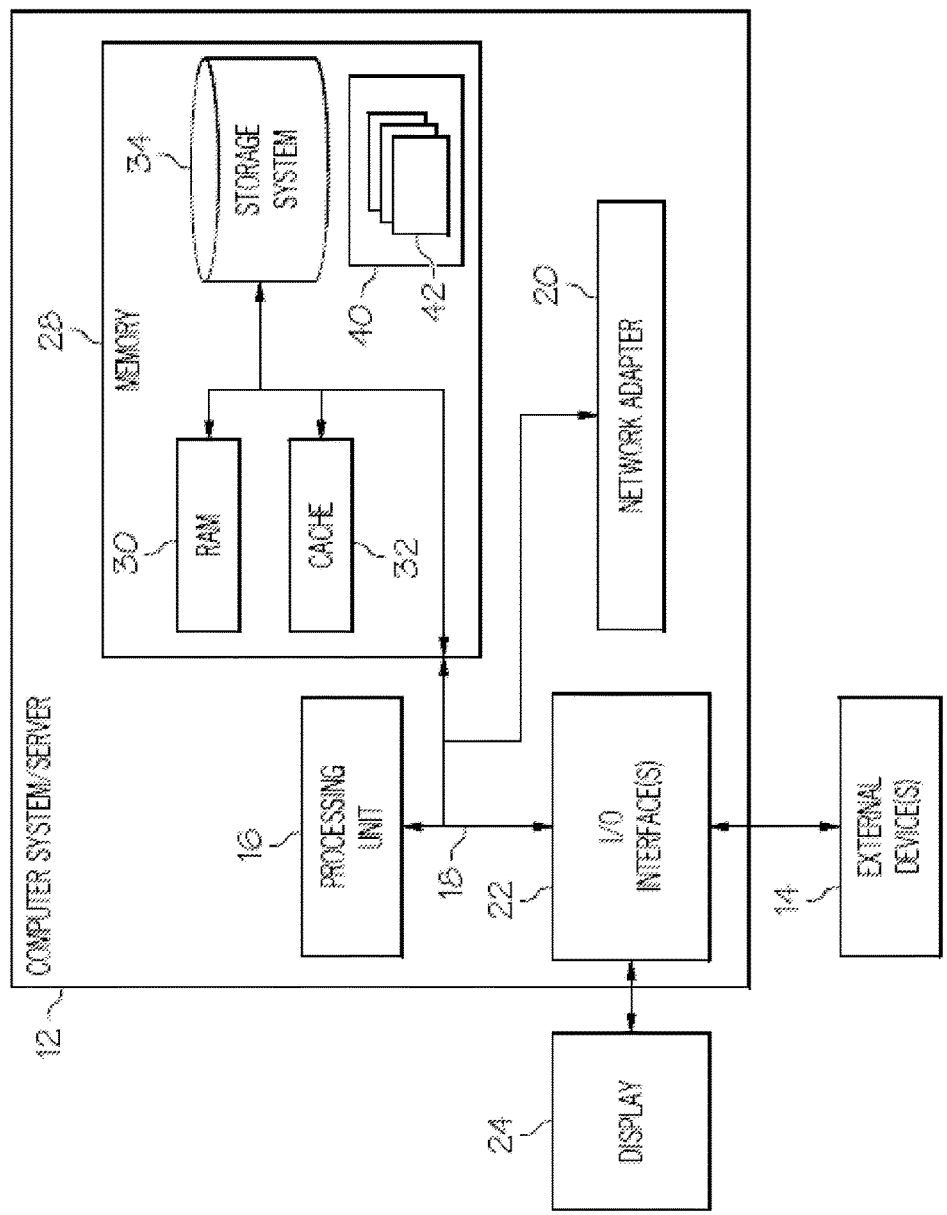
FIG. 4 depicts a cloud computing node, according to various embodiments.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
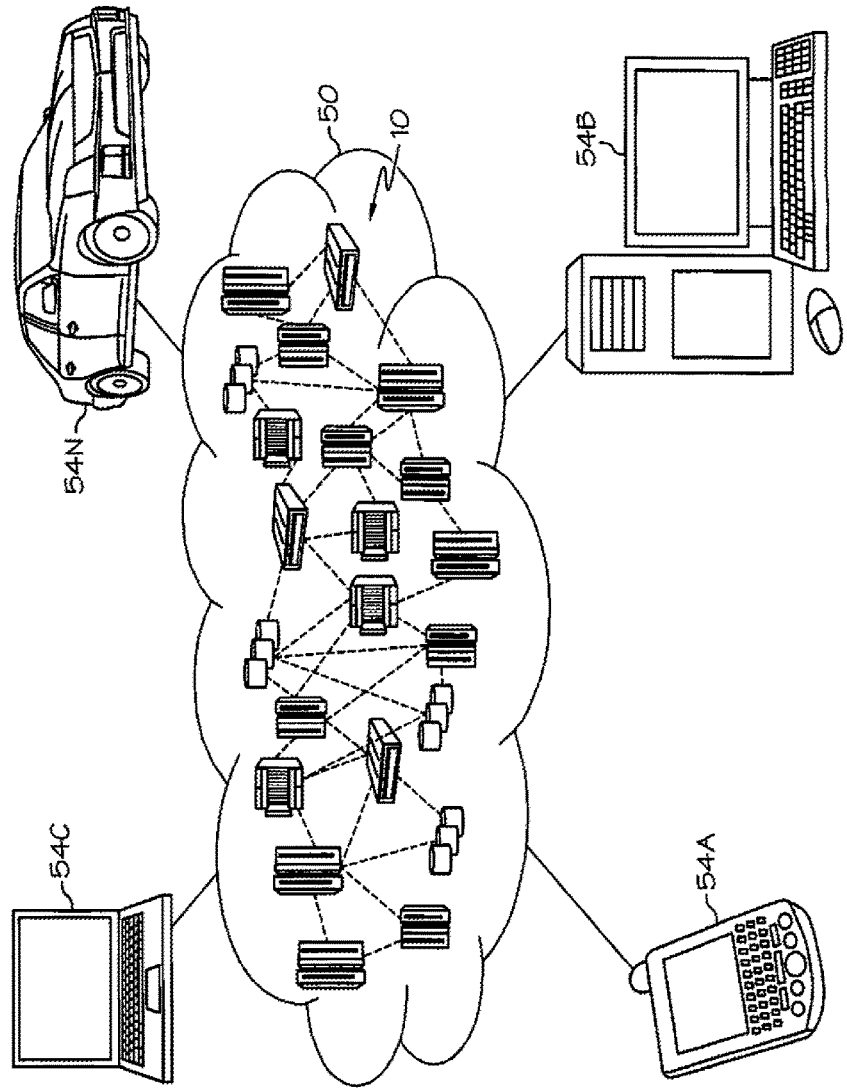
FIG. 5 depicts a cloud computing environment, according to various embodiments.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
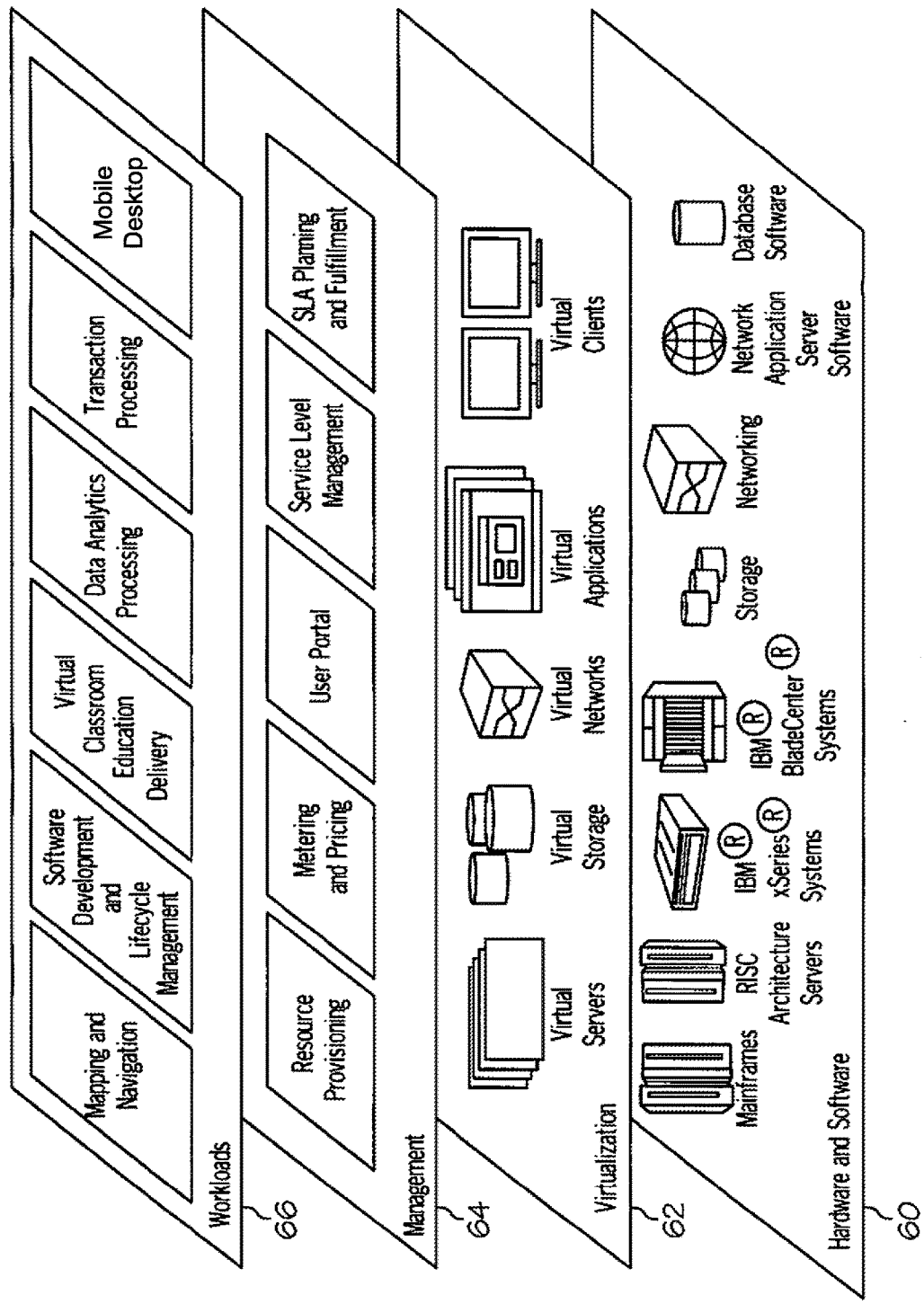
FIG. 6 depicts abstraction model layers, according to various embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). An example of a function of the software may be for storing already encrypted network data in a secure storage without first decrypting it and encrypting it for the storage device.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the invention has been described with reference to specific embodiments thereof, those skilled in the art will be able to make various modifications to the described embodiments without departing from the true spirit and scope of the embodiments. The terms and descriptions used herein are set forth by way of illustration only and are not meant as limitations. Those skilled in the art will recognize that these and other variations are possible within the spirit and scope of the embodiments as defined in the following claims and their equivalents.

What is claimed is:

1. A method, comprising:
receiving, by a target machine, an encrypted first data object from a build machine via a network in an encrypted file system;
determining the encrypted first data object was encrypted by the build machine with a first encryption key;
determining that the encrypted first data object is to be stored in the encrypted file system;
conserving the target machine resources by bypassing a decryption/re-encryption process for the file;
encrypting the first encryption key with a second encryption key, in response to the determining that the encrypted first data object is to be stored in the encrypted file system;
attaching the encrypted first encryption key to the encrypted first data object as metadata, in response to the determining that the encrypted first data object is to be stored in the encrypted file system;
storing the encrypted first data object in the encrypted file system, wherein the encrypted first data object is associated with the encrypted first encryption key as metadata;
receiving a command to use the encrypted first data object;
decrypting the encrypted first encryption key with the second encryption key; and
decrypting the encrypted first data object with the decrypted first encryption keys;
receiving an unencrypted second data object;
determining that the unencrypted second data object is to be stored in the encrypted file system;
encrypting the unencrypted second data object with a third encryption key, in response to the determining that the second data object is to be stored in the encrypted file system;
encrypting the third encryption key with the second encryption key, in response to the determining that the second data object is to be stored in the encrypted file system;
attaching the encrypted third encryption key to the encrypted second data object; and
storing the encrypted second data object in the encrypted file system, wherein the encrypted second data object is associated with the encrypted third encryption key.

2. The method of claim 1, wherein the first encryption key is a symmetric session key.

3. The method of claim 1, wherein the second encryption key is a public key of a public/private key pair.

4. The method of claim 1, wherein the second encryption key is stored in a user keystore.

5. The method of claim 1, further comprising:
determining that the first encryption key is encrypted, and decrypting the first encryption key with a fourth encryption key when the first encryption key is received.

6. A computer system for storing a data, comprising:
a processor;
an encrypted file system communicatively coupled to the processor; and
memory communicatively coupled to the processor and encrypted file system, wherein the memory is encoded with instructions, and wherein the instructions when executed by the processor include:
receiving an encrypted first data object from a build machine via a network in an encrypted file system;
determining the encrypted first data object was encrypted by the build machine with a first encryption key;
determining that the encrypted first data object is to be stored in the encrypted file system;
conserving system resources by bypassing a decryption/re-encryption process for the file;
encrypting the first encryption key with a second encryption key, in response to the determining that the first data object is to be stored in the encrypted file system;
attaching the encrypted first encryption key to the encrypted first data object as metadata, in response to the determining that the first data object is to be stored in the encrypted file system;
storing the encrypted first data object in the encrypted file system, wherein the encrypted first data object is associated with the encrypted first encryption key using metadata;
receiving a command to use the encrypted first data object;
decrypting the encrypted first encryption key with the second encryption key;
decrypting the encrypted first data object with the decrypted first encryption key;
receiving an unencrypted second data object;
determining that the unencrypted second data object is to be stored in the encrypted file system;
encrypting the unencrypted second data object with a third encryption key, in response to the determining that the second data object is to be stored in the encrypted file system;
encrypting the third encryption key with the second encryption key, in response to the determining that the second data object is to be stored in the encrypted file system;
attaching the encrypted third encryption key to the encrypted second data object; and
storing the encrypted second data object in the encrypted file system, wherein the encrypted second data object is associated with the encrypted third encryption key.

7. The system of claim 6, wherein the first encryption key is a symmetric session key.

8. The system of claim 6, wherein the second encryption key is a public key of a public/private key pair.

9. The system of claim 6, wherein the second encryption key is stored in a user keystore.

10. The system of claim 6, wherein the instructions further comprising:
determining that the first encryption key is encrypted, and decrypting the first encryption key with a fourth encryption key when the first encryption key is received.

11. A computer program product storing a data object received from a network in an encrypted file system that requires encryption of the data object with an encryption key, the computer program product comprising a computer readable storage device having program code embodied therewith, the program code executable by a computer system configured to:
receive an encrypted first data object from a build machine via a network in an encrypted file system;
determine the encrypted first data object was encrypted by the build machine with a first encryption key;
determine that the encrypted first data object is to be stored in the encrypted file system;
conserve system resources by bypassing a decryption/re-encryption process for the file;
encrypt the first encryption key with a second encryption key, in response to the determining that the first data object is to be stored in the encrypted file system;
attach the encrypted first encryption key to the encrypted first data object as metadata, in response to the determining that the first data object is to be stored in the encrypted file system;
store the encrypted first data object in the encrypted file system, wherein the encrypted first data object is associated with the encrypted first encryption key using metadata;
receive a command to use the encrypted first data object;
decrypt the encrypted first encryption key with the second encryption key; and
decrypt the encrypted first data object with the decrypted first encryption key;
receive an unencrypted second data object;
determine that the unencrypted second data object is to be stored in the encrypted file system;
encrypt the unencrypted second data object with a third encryption key, in response to the determining that the second data object is to be stored in the encrypted file system;
encrypt the third encryption key with the second encryption key, in response to the determining that the second data object is to be stored in the encrypted file system;
attach the encrypted third encryption key to the encrypted second data object; and
store the encrypted second data object in the encrypted file system, wherein the encrypted second data object is associated with the encrypted third encryption key.

12. The computer program product of claim 11, wherein the program code executable by the processor is further configured to:
determine that the first encryption key is encrypted, and decrypt the first encryption key with a fourth encryption key when the first encryption key is received.

13. The computer program product of claim 11, wherein the first encryption key is a symmetric session key.

14. The computer program product of claim 11, wherein the second encryption key is a public key of a public/private key pair belonging to an authorized user of the encrypted data object and the third encryption key is a symmetric file key.

15. The method of claim 1, wherein the third encryption key is a symmetric file key.

16. The system of claim 6, wherein the third encryption key is a symmetric file key.

17. The computer program product of claim 11, wherein the second encryption key is a public key of a public/private key pair belonging to an authorized user of the encrypted data object.

18. The system of claim 6, wherein the processor is further configured to:
 decrypt the encrypted first data object, in response to receiving the encrypted first data object;
 process the first data object;
 re-encrypt the first data object; and
 store the re-encrypted first data object in the encrypted file system.

19. The method of claim 1, wherein the encrypted first data object is received by the target machine, the target machine already having the first encryption key when the encrypted first data object is received.

20. The method of claim 1, wherein bypassing the decryption/re-encryption process reduces the use of resources.

* * * * *